(12) United States Patent
Lokai et al.

(10) Patent No.: US 6,580,517 B2
(45) Date of Patent: Jun. 17, 2003

(54) ABSOLUTE WAVELENGTH CALIBRATION OF LITHOGRAPHY LASER USING MULTIPLE ELEMENT OR TANDEM SEE THROUGH HOLLOW CATHODE LAMP

(75) Inventors: Peter Lokai, Bovenden (DE); Thomas Schroeder, Goettingen (DE)

(73) Assignee: Lambda Physik AG, Goettingen (DE)

( * ) Notice: Subject to any disclaimer, the term of this patent is extended or adjusted under 35 U.S.C. 154(b) by 56 days.

(21) Appl. No.: 09/791,431

(22) Filed: Feb. 22, 2001

(65) Prior Publication Data

US 2002/0003817 A1 Jan. 10, 2002

Related U.S. Application Data

(60) Provisional application No. 60/202,564, filed on Jun. 10, 2000, and provisional application No. 60/186,096, filed on Mar. 1, 2000.

(51) Int. Cl.$^7$ ................................................ H01S 3/22
(52) U.S. Cl. ........................................ 356/519; 372/20
(58) Field of Search .......................... 356/519; 372/20, 372/9, 19, 29.02, 32, 34, 36, 38.08, 57, 61, 92, 107

(56) References Cited

U.S. PATENT DOCUMENTS

| 3,806,829 A | 4/1974 | Duston et al. ............. 331/94.5 |
| 4,016,504 A | 4/1977 | Klauminzer ................ 331/94.5 |
| 4,309,671 A | 1/1982 | Malyon .................. 331/94.5 S |
| 4,319,843 A | 3/1982 | Gornall ....................... 356/346 |
| 4,331,937 A | 5/1982 | Brown et al. ................. 372/74 |

(List continued on next page.)

FOREIGN PATENT DOCUMENTS

| DE | 40 29 687 A1 | 9/1990 | ............ H01S/3/082 |
| DE | 42 25 781 A1 | 8/1992 | ............ H01S/3/08 |
| DE | 41 14 407 A1 | 11/1992 | |
| DE | 298 22 082 U1 | 2/1999 | ............ H01S/3/08 |
| DE | 298 22 090 U1 | 2/1999 | ............ H01S/3/08 |
| DE | 299 07 349 U1 | 7/2000 | ......... H01S/3/086 |
| EP | 0 472 727 B1 | 11/1990 | ........ H01S/3/1055 |
| EP | 0 570 243 A1 | 5/1993 | ........... H01S/3/139 |
| EP | 0 454 399 B1 | 9/1995 | ........... H01S/3/137 |
| EP | 0 855 811 A2 | 7/1998 | ......... H04B/10/145 |
| EP | 0 875 743 A1 | 11/1998 | ............. G01J/9/02 |
| EP | 0 867 989 B1 | 9/1999 | ........ H01S/3/1055 |
| EP | 1 063 503 A1 | 12/2000 | ............. G01J/9/02 |
| JP | 2-631554 | 4/1997 | ........ H01S/3/1055 |
| WO | WO 96/07224 | 3/1996 | ............. H01S/3/13 |
| WO | WO 01/18923 A1 | 3/2001 | ............. H01S/3/22 |
| WO | WO 01/46658 A1 | 6/2001 | ............. G01J/3/18 |

OTHER PUBLICATIONS

Emara, S., "Wavelength Shifts in Hg$^{198}$ as a Function of Temperature," *Journal of Research of the National Bureau of Standards—A. Physics and Chemistry*, vol. 65A, No. 6, Nov.–Dec. 1961, pp. 473–474.

(List continued on next page.)

*Primary Examiner*—Constantine Hannaher
*Assistant Examiner*—Otilia Gabor
(74) *Attorney, Agent, or Firm*—Stallman & Pollock LLP

(57) ABSTRACT

A tunable laser system includes a gain medium and an optical resonator for generating a laser beam, and a spectral narrowing and tuning unit within the resonator. A detection and control unit controls a relative wavelength of the laser system. A wavelength calibration module calibrates the detection and control unit. The module contains more than one species each having an optical transition line within the tuning spectrum of the laser. A beam portion of the narrowed emission from the laser is directed through the wavelength calibration module and a beam portion is directed through the detection and control unit when the laser beam is scanned through the optical transition line of each of the species within the module. The detection and control unit is monitored and calibrated during the scanning.

20 Claims, 4 Drawing Sheets

U.S. PATENT DOCUMENTS

| | | | |
|---|---|---|---|
| 4,348,647 A | 9/1982 | Nighan et al. | 372/74 |
| 4,404,366 A | 9/1983 | Boguslaski et al. | 536/18.1 |
| 4,435,808 A | 3/1984 | Javan | 372/11 |
| 4,468,773 A | 8/1984 | Seaton | 372/32 |
| 4,513,422 A | 4/1985 | Buholz | 372/29 |
| 4,558,952 A | 12/1985 | Kulesh et al. | 356/349 |
| 4,592,043 A | 5/1986 | Williams | 370/3 |
| 4,611,270 A | 9/1986 | Klauminzer et al. | 364/183 |
| 4,823,354 A | 4/1989 | Znotins et al. | 372/57 |
| 4,829,536 A | 5/1989 | Kajiyama et al. | 372/57 |
| 4,847,854 A * | 7/1989 | Van Dijk | 372/92 |
| 4,856,018 A | 8/1989 | Nozue et al. | 372/98 |
| 4,905,243 A | 2/1990 | Lokai et al. | 372/32 |
| 4,911,778 A | 3/1990 | Barnoach | 156/466 |
| 4,914,662 A | 4/1990 | Nakatani et al. | 372/32 |
| 4,926,428 A | 5/1990 | Kajiyama et al. | 372/20 |
| 4,975,919 A | 12/1990 | Amada et al. | 372/33 |
| 5,025,445 A | 6/1991 | Anderson et al. | 372/20 |
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,144,632 A | 9/1992 | Thonn | 372/33 |
| 5,150,370 A | 9/1992 | Furuya et al. | 372/106 |
| 5,198,872 A | 3/1993 | Wakabayashi et al. | 356/352 |
| 5,218,421 A | 6/1993 | Wakabayashi et al. | 356/352 |
| 5,225,884 A | 7/1993 | Stark et al. | 356/73 |
| 5,226,050 A | 7/1993 | Burghardt | 372/20 |
| 5,307,364 A | 4/1994 | Turner | 372/60 |
| 5,373,515 A | 12/1994 | Wakabayashi et al. | 372/20 |
| 5,404,366 A | 4/1995 | Wakabayashi et al. | 372/29 |
| 5,420,877 A | 5/1995 | Sandstrom | 372/34 |
| 5,450,207 A | 9/1995 | Fomenkov | 356/416 |
| 5,450,436 A | 9/1995 | Mizoguchi et al. | 372/59 |
| 5,479,431 A | 12/1995 | Sobottke et al. | 372/92 |
| 5,559,816 A | 9/1996 | Basting et al. | 372/27 |
| 5,596,596 A | 1/1997 | Wakabayashi et al. | 372/102 |
| 5,642,374 A | 6/1997 | Wakabayashi et al. | 372/57 |
| 5,684,822 A | 11/1997 | Partlo | 372/95 |
| 5,748,316 A | 5/1998 | Wakabayashi et al. | 356/352 |
| 5,761,236 A | 6/1998 | Kleinschmidt et al. | 372/100 |
| 5,764,678 A | 6/1998 | Tada | 372/57 |
| 5,771,094 A | 6/1998 | Carter et al. | 356/326 |
| 5,802,094 A | 9/1998 | Wakabayashi et al. | 372/57 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,867,514 A | 2/1999 | Anderson | 372/38 |
| 5,898,725 A | 4/1999 | Fomenkov et al. | 372/102 |
| 5,901,163 A | 5/1999 | Ershov | 372/20 |
| 5,917,849 A | 6/1999 | Ershov | 372/102 |
| 5,946,337 A | 8/1999 | Govorkov et al. | 372/92 |
| 5,949,806 A | 9/1999 | Ness et al. | 372/38 |
| 5,956,355 A * | 9/1999 | Swanson et al. | 372/20 |
| 5,970,082 A | 10/1999 | Ershov | 372/102 |
| 5,978,391 A | 11/1999 | Das et al. | 372/20 |
| 5,978,394 A | 11/1999 | Newman et al. | 372/32 |
| 5,978,409 A | 11/1999 | Das et al. | 372/100 |
| 5,982,800 A | 11/1999 | Ishihara et al. | |
| 5,991,324 A | 11/1999 | Knowles et al. | 372/57 |
| 6,014,398 A | 1/2000 | Hofmann et al. | 372/60 |
| 6,028,879 A | 2/2000 | Ershov | 372/57 |
| 6,061,129 A | 5/2000 | Ershov et al. | 356/328 |
| 6,061,382 A | 5/2000 | Govorkov et al. | 372/101 |
| 6,078,599 A | 6/2000 | Everage et al. | 372/20 |
| 6,081,542 A | 6/2000 | Scaggs | 372/70 |
| 6,094,448 A | 7/2000 | Fomenkov et al. | 372/102 |
| 6,154,470 A | 11/2000 | Basting et al. | 372/19 |
| 6,157,662 A | 12/2000 | Scaggs et al. | 372/60 |
| 6,160,831 A | 12/2000 | Kleinschmidt et al. | 372/57 |
| 6,160,832 A * | 12/2000 | Kleinschmidt et al. | 372/57 |
| 6,163,559 A | 12/2000 | Watson | 372/102 |
| 6,219,368 B1 | 4/2001 | Govorkov | 372/59 |
| 6,240,110 B1 | 5/2001 | Ershov | 372/57 |
| 6,243,163 B1 | 6/2001 | Wakabayashi et al. | 356/326 |
| 6,243,170 B1 | 6/2001 | Ershov | 356/519 |
| 6,269,110 B1 * | 7/2001 | Leinhos et al. | 372/57 |
| 6,272,158 B1 * | 8/2001 | Kleinschmidt et al. | 372/32 |
| 6,285,701 B1 | 9/2001 | Albrecht et al. | 372/57 |
| 6,330,253 B1 * | 12/2001 | Tuganov et al. | 372/9 |
| 6,381,256 B1 * | 4/2002 | Stamm et al. | 372/19 |
| 6,404,795 B1 * | 6/2002 | Leinhos et al. | 372/57 |
| 2001/0013933 A1 | 8/2001 | Smith et al. | 356/454 |

OTHER PUBLICATIONS

J. Caplan, "Temperature and Pressure Effects on Pressure–Scanned Etalons and Gratings," *Applied Optics*, vol. 14, No. 7, Jul. 1975, pp. 1585–1591.

Masakatsu Okada et al., "Electronic Tuning of Dye Lasers by an Electro–optic Birefringent Fabry—Perot Etalon," *Optics Communications*, vol. 14, No. 1, pp. 4–7, 1975.

R.B. Green et al., "Galvanic Detection of Optical Absorptions in a Gas Discharge," *Applied Physics Letters*, vol. 29, No. 11, pp. 727–729, Dec. 1, 1976.

H. H. Barrett, et al., "Retroreflective arrays as approximate phase conjugators," *Opt. Lett. 4*, vol. 4, No. 6, 1979, pp. 190–192.

R.A. Keller et al., "Opto–galvanic Spectroscopy in a Hollow Cathode Discharge," *J. Opt. Soc. Am.*, vol. 69, No. 5, pp. 738–742, May 1979.

Richard A. Keller et al., Atlas for Optogalvanic Wavelength Calibration, *Applied Optics*, vol. 19, No. 6, pp. 836–837, Mar. 15, 1980.

N. Tan–No, et al., "Dispersion–free amplification and oscillation in phase–conjugate four–wave mixing in an atomic vapor doublet," *IEEE J. Quantum Electronics*, 16, 1980, pp. 147–153.

W. Demtröder, *Laser Spectroscopy*, published by Springer, Berlin 1981, Chapter 4: Spectroscopic Instrumentation, pp. 99–221.

M.D. Levenson, et al., "Projection photolithography by wave–front conjugation," *J. Opt. Soc. Am*, vol. 71, No. 6, Jun. 1981, pp. 737–743.

T.R. Hicks, "Tunable Fabry–Perot Filters," *Opt. Eng.*, vol. 20, No. 6 (1981) pp. 806–514.

Norman J. Dovichi, et al., "Use of the Optogalvanic Effect and the Uranium Atlas for Wavelength Calibration of Pulsed Lasers," *Applied Optics*, vol. 21, No. 8, pp. 1468–1473, Apr. 12, 1982.

D.L. Jordan, et al., "Experimental Measurements of Non-–Gaussian Scattering by a Fractal Diffuser," *Applied Physics B.*, vol. 31, 1983, pp. 179–186.

P. Camus, "Atomic Spectroscopy with Optogalvanic Detection," *Journal De Physique*, (Paris) 11C7, pp. C7–87–106, Nov. 1983.

R. Martinez–Herrero, et al., "Transmitted Amplitude by a Fabry–Perot Interferometer with Random Surface Defects," *Applied Optics*, vol. 24, No. 3, Feb. 1, 1985, pp. 315–316.

D.P. Mahapatra, et al., "Exact Evaluation of the Transmittal Amplitude for a Fabry–Perot Interferometer with Surface Defects," *Applied Optics*, vol. 25, No. 10, May 26, 1986, pp. 1646–1649.

Andersson, M., et al., "Compressible Favry–Perot Refractometer," *Applied Optics*, vol. 26, No. 22, Nov. 15, 1987, pp. 4835–4840.

F. Babin et al., "Ultraviolet Optogalvanic Laser Spectroscopy of Iron for Reference Wavelengths," *Optics Letters*, vol. 12, No. 7, pp. 468–470, Jul. 1987.

D.R. Hall, et al., *The Physics and Technology of Laser Resonator*, 1989, pp. 1–20, 94–104, 117–131, 143–153, 176–189, 220–245.

R.S. Sandstrom, "Argon Fluoride Excimer Laser Source for Sub–0.25mm Optical Lithography," *Optical/Laser Microlitography IV*, vol. 1463, pp. 610–616, 1991.

R.K. Tyson, *Principles of Adaptive Optics, $2^{nd}$* Edition, 1991, Chapter 5: Wavefront Sensing, pp. 121–202.

Sansonetti, J.E., et al., "Atlas of the Spectrum of a Platinum/ Neon Hollow–Cathode Reference Lamp in the Region 1130–4330 A", *Journal of Research of the National Institute of Standards and Technology*, vol. 97, No. 1, Jan.–Feb. 1992, 1–211.

M. Kakehata, et al., "Output Characteristics of a Discharge–pumped Fe Laser (157nm) with an Injection–seeded Unstable Resonator," *J. Appl. Phys.*, vol. 74, No. 4, Aug. 15, 1993, pp. 2241–2246.

S.M. Hooker, et al., "Progress in Vacuum Ultraviolet Lasers," *Progress in Quantum Electronics*, vol. 18, 1994, pp. 227–274.

MacBride, et al., "Effect of Temperature Variation on FT–IR Spectomoter Stability," *Applied Spectroscopy*, 1997, vol. 51, No. 1, pp. 43–50.

Wakabayashi, et al., "Billion Level Durable ArF Excimer Laser with Highly Stable Ernergy," *SPIE $24^{th}$ Annual International Symposium on Microlithography*, Santa Clara, Calif., May 14–19, 1999.

A.I. Ershov, et al., "Novel Metrology for Measuring Spectral Purity of KrF Lasers for Deep UV Lithography," *Proceedings of SPIE*, vol. 3677, Jun. 1999, pp. 611–620.

Sansonetti, et al., "Precision Measurement of Wavelengths Emitted by a Molecular Fluorine Laser at 157 nm," *Applied Optics*, vol. 40, No. 12, Apr. 20, 2001, pp. 1974–1978.

* cited by examiner

ABSOLUTE WAVELENGTH CALIBRATION OF LITHOGRAPHY LASER USING MULTIPLE ELEMENT OR TANDEM SEE THROUGH HOLLOW CATHODE LAMP

PRIORITY

This application claims the benefit of priority to U.S. provisional patent application Nos. 60/202,564, filed Jun. 10, 2000, and 60/186,096, filed Mar. 1, 2000.

BACKGROUND OF THE INVENTION

1. Field of the Invention

The present invention relates to a wavelength calibration module and technique, and particularly to an absolute wavelength calibration module containing one or more materials having optical transitions at known wavelengths for detecting such transitions when a narrowed emission band of an excimer or molecular fluorine laser interacts with the materials of the module.

2. Discussion of the Related Art

Excimer lasers emitting pulsed UV-radiation are becoming increasingly important instruments in specialized material processing. The KrF-excimer laser emitting around 248 nm and the ArF-excimer laser emitting around 193 nm are rapidly becoming the light sources of choice for photolithographic processing of integrated circuit devices (IC's). The $F_2$-laser is also being developed for such usage and emits light around 157 nm.

It is important for their respective applications to the field of sub-quarter micron silicon processing that each of the above laser systems become capable of emitting a narrow spectral band around a very precisely determined and finely adjustable absolute wavelength. Techniques for reducing bandwidths by special resonator designs to less than 100 pm, and in some cases to less than 0.6 pm, are well known. Techniques are also available for tuning and controlling central wavelengths of emission. However, most of these techniques do not accurately determine absolute wavelengths and only serve to relatively tune and control wavelengths. Moreover, even relative wavelength changes cannot be as precisely determined as is desired, using these techniques.

It is possible to roughly determine an absolute wavelength or a change in wavelength from a reference wavelength as a spectral band is tuned, when particular incremental settings of a spectrograph are calibrated to correspond to absolute wavelengths in conventional units, e.g., in nanometers. However, conventional techniques do not provide very precise absolute wavelength and incremental wavelength change information at any time. This is because a conventional spectrograph often must undergo a laborious conventional calibration technique. Moreover, optical drift and other optical, thermal and electronic phenomena produce uncertainty and imprecision at all times following the calibration procedure, including during operation of the system. Further, wavelength calibration is usually done externally to the operating beam path of the system using high resolution spectrographs in combination with spectral reference tools for wavelength calibration, e.g., spectral lamps emitting particular narrow lines. Therefore, very precise and temporally advantageous absolute wavelength determination and fine tuning methods are needed.

Specifically, it is desired to have absolute wavelength calibration techniques for UV-emitting excimer and molecular lasers having accuracies within a range of ±0.05 pm, while having tuning versatility comprising wavelength ranges from ±5 pm to greater than ±100 pm depending on properties of available illumination tools for IC production. There are available techniques for accurately determining absolute wavelength for narrow band KrF and ArF-excimer laser emissions using narrow spectral absorption lines of certain elements to calibrate a high resolution spectrometer. Among these available techniques, atomic transition(s) of iron (Fe) at 248.327 and/or 248.4185 nm are used to detect absorption signals either by reduced optical transmission or using the opto-galvanic effect. See U.S. Pat. No. 4,823,354 to Znotins et al.; U.S. Pat. No. 5,450,207 to Fomenkov; F. Babin et al., Opt. Lett., v. 12, p. 486 (1987); See also R. B. Green et al., Appl. Phys. Lett., v. 29, p. 727 (1976) (describing galvanic detection of optical absorptions in a gas discharge for various gases including lithium (Li), sodium (Na), uranium (U) and barium (Ba)).

Babin et al. discloses using the opto-galvanic effect to determine the KrF-laser absolute emission wavelength. A galvatron having an anode and a cathode is set in the optical path of the laser beam. An Fe vapor fills the galvatron. A voltage is monitored between the cathode and anode. The emission wavelength of the laser is narrowed and tuned through a range around 248 nm. When the wavelength of the beam impinging the Fe-vapor filled gas volume between the cathode and the anode corresponds to an atomic transition of Fe, a resonance between the levels causes a marked change in voltage between the anode and cathode. Since the absorption lines of Fe are well known and consistent, the absolute wavelength of the narrowed laser emission band is determinable.

Znotins et al. and Fomenkov each disclose using a photodetector to detect the intensity of light emitted from a KrF-laser. Znotins et al. discloses to use a gas cell having benzene vapor inside. Fomenkov discloses to use a galvatron having an Fe cathode inside. The cathode of Fomenkov gives off Fe vapor which fills the galvatron when a current is generated between the cathode and an associated anode. Light emitted from the KrF-laser traverses the gaseous benzene or iron medium of the galvatron before impinging the photodetector. When the wavelength corresponds to an atomic transition of the gas medium of the galvatron, the gas absorbs the light, and the intensity of light detected is reduced. Thus, the absolute wavelength of emission of the KrF-laser is also determinable in this alternative way.

The opto-galvanic effect described by Babin et al. and acknowledged by Fomenkov permits a very precise and reliable determination of an absolute emission wavelength of a KrF-excimer laser system. See also U.S. Pat. No. 4,905,243 to Lokai et al. A known technique uses sealed hollow cathode lamps containing Fe-vapor in a Ne-buffer gas environment. See Hammamatsu Datasheet: Opto-Galvanic Sensor, Galvatron L 2783 Series, November 1989, Japan. Thus, the Fe-lamp has become an important and reliable measuring tool for absolute wavelength calibration for KrF-lithography laser systems in the 248 nm spectral region.

Advantageous techniques have also been described for performing wavelength calibration for the ArF laser emitting around 193.3 nm. For example, U.S. Pat. No. 6,160,832 describes the use of an opto-galvanic or photoabsorption cell containing a species that makes an optical transition within the broadband tuning spectrum of the ArF laser around 193.3 nm, and particularly describing a cell filled with platinum vapor.

Reference laser lines have also been used for absolute wavelength calibration (see U.S. Pat. Nos. 5,218,421, 6,160, 831 and 5,373,515, which are hereby incorporated by reference). A Fabry-Peron etalon has been described for use with relative wavelength calibration, i.e., for determining the precise wavelength of a laser beam that is shifted away from one of the reference optical transmission lines (see the patent documents mentioned above and U.S. Pat. Nos. 5,025,445, 5,420,877, which are hereby incorporated by reference).

In summary, wavelength calibration using a gas-filled cell having one or more optical transition lines around the laser line, e.g., 248 nm for the KrF laser or 193 nm for the ArF laser, and using the opto-galvanic effect or a photodetector, have been described previously at U.S. Pat. Nos. 6,160,832, 4,905,243, 5,450,207, 4,926,428, 5,978,394, and 5,978,391, which are hereby incorporated by reference, and reference laser lines have been used. It is desired to have a very accurate apparatus and method for performing absolute wavelength calibration for an excimer or molecular fluorine laser, and particularly for the next generation ArF and $F_2$ lasers. In addition, it is desired to have an absolute wavelength calibration system for precision determination of the free spectral range (FSR) of a monitor Fabry-Perot etalon and for precise determination of a tunable grating scanning constant.

SUMMARY OF THE INVENTION

A tunable laser system is provided including a gain medium, an optical resonator for generating a laser beam, and a spectral narrowing and tuning unit. A detection and control unit monitors a relative wavelength of the laser system. A wavelength calibration module calibrates the detection and control unit. The module contains more than one species each having an optical transition line within the tuning spectrum of the laser. A beam portion of the narrowed emission from the laser is directed through the wavelength calibration module and a beam portion is directed through the detection and control unit when the laser beam is scanned through the optical transition line of each of the species within the module. The detection and control unit is monitored and calibrated during the scanning.

A tunable laser system is further provided including a gain medium, an optical resonator for generating a laser beam, and a spectral narrowing and tuning unit. A wavelength calibration module contains multiple species each having an optical transition line within the tuning range of the laser. A beam portion of the narrowed emission from said laser is directed through the wavelength calibration module when the laser beam is scanned through the optical transition line of each of the multiple species. The spectral narrowing and tuning unit is monitored and calibrated in tuning steps.

A tunable laser system is further provided including a gain medium, an optical resonator for generating a laser beam, and a spectral narrowing and tuning unit. A detection and control unit monitors a relative wavelength of the laser beam. A wavelength calibration module for calibrating the detection and control unit contains at least one species having an optical transition line within the tuning range of the laser and a buffer gas, preferably of krypton, and alternatively of neon, xenon or helium. A beam portion of the narrowed emission from the laser is directed through the wavelength calibration module and a beam portion is directed through the detection and control unit when the laser beam is scanned through the optical transition line of the at least one species and said detection and control unit is monitored for calibrating the detection and control unit.

A method is provided for calibrating a wavelength detection and control unit of a tunable laser system having a wavelength calibration module containing multiple species each having an optical transition line within the tunable range of the laser. The method includes generating a line-narrowed laser beam and directing a narrowed beam portion through the wavelength calibration module. A narrowed beam portion is further directed through the detection and control unit. The laser beam is scanned through the optical transition line of each of the multiple species, and the detection and control unit is monitored during the scanning for calibrating the detection and control unit.

A method is further provided for calibrating a wavelength detection and control unit of a tunable laser system having a wavelength calibration module containing multiple species each having an optical transition line within the tunable range of said laser. The method includes generating a line-narrowed laser beam and directing a narrowed beam portion through the wavelength calibration module. The laser beam is scanned through the optical transition line of each of the multiple species. The spectral narrowing and tuning unit is monitored during the scanning for calibrating tuning steps of the spectral narrowing and tuning unit.

A method is further provided for calibrating a wavelength detection and control unit of a tunable laser system having a wavelength calibration module containing at least one species having an optical transition line within the tunable range of the laser, a spectral narrowing and tuning unit, and a wavelength detection and control unit. The method includes pressurizing the wavelength calibration module with a buffer gas sufficient to produce marking lines within a tuning range of the laser system and generating a line-narrowed laser beam. A narrowed beam portion is directed through the wavelength calibration module. A narrowed beam portion is directed through the detection and control unit. The laser beam is scanned through the optical transition line of the at least one species. The detection and control unit is monitored during the scanning for calibrating the detection and control unit.

A method is further provided for calibrating a wavelength detection and control unit of a tunable laser system having a wavelength calibration module containing at least one species having an optical transition line within the tuning range of the laser, and a spectral narrowing and tuning unit. The method includes pressurizing the wavelength calibration module with a buffer gas sufficient to produce marking lines within a tuning spectrum of the laser system and generating a line-narrowed laser beam. A narrowed beam portion is directed through the wavelength calibration module. The laser beam is scanned through the optical transition line of the at least one species. The spectral narrowing and tuning unit is monitored during the scanning for calibrating tuning steps of the spectral narrowing and tuning unit.

BRIEF DESCRIPTION OF THE DRAWINGS

FIG. 2 schematically shows an equivalent circuit corresponding to the use of the wavelength calibration module of the system of FIG. 1a.

INCORPORATION BY REFERENCE

R. B. Green et al., "Galvanic Detection of Optical Absorptions in a Gas Discharge," Applied Physics Letters, Vol. 29, No. 11, pp.727–729, Dec. 1, 1976;

R. Sandstrom, "Argon Fluoride Excimer Laser Source for Sub-0.25 mm Optical Lithography," Optical/Laser Microlithography IV, Vol. 1463, pp.610–616, 1991;

F. Babin et al., "Ultraviolet Optogalvanic Laser Spectroscopy of Iron for Reference Wavelengths," Optics Letters, Vol. 12, No. 7, pp. 468–470, July 1987;

P. Camus, "Atomic Spectroscopy with Optogalvanic Detection, Journal De Physique, (Paris) 11C7, pp. C7–87–106, November 1983;

Richard A. Keller et al., "Atlas for optogalvanic wavelength calibration," Applied Optics, Vol. 19, No. 6, pp. 836–837, Mar. 15, 1980;

R. A. Keller et al., "Opto-galvanic spectroscopy in a uranium hollow cathode discharge," J. Opt. Soc. Am., Vol. 69, No. 5, pp. 738–742, May 1979;

Norman J. Dovichi, et al., "Use of the optogalvanic effect and the uranium atlas for wavelength calibration of pulsed lasers," Applied Optics, Vol. 21, No. 8, pp. 1468–1473, Apr. 15, 1982;

Masakatsu Okada et al., "Electronic Tuning of Dye Lasers by an Electroooptic Birefringent Fabry-Perot Etalon," Optics Communications, Vol. 14, No. 1, pp. 4–7, 1975; and U.S. patent application Nos. 09/416,344 and 60/186,096; and U.S. Pat. Nos. 4,926,428, 5,978,394, 5,450,207, 4,905,243, 5,978,391, 4,823,354, 4,319,843, 4,911,778, 4,914,662, 5,142,543, 5,198,872, 5,218,421, 5,404,366, 5,764,678, 5,771,094 and 5,025,445.

DETAILED DESCRIPTION OF THE PREFERRED EMBODIMENTS

Figure 1A:
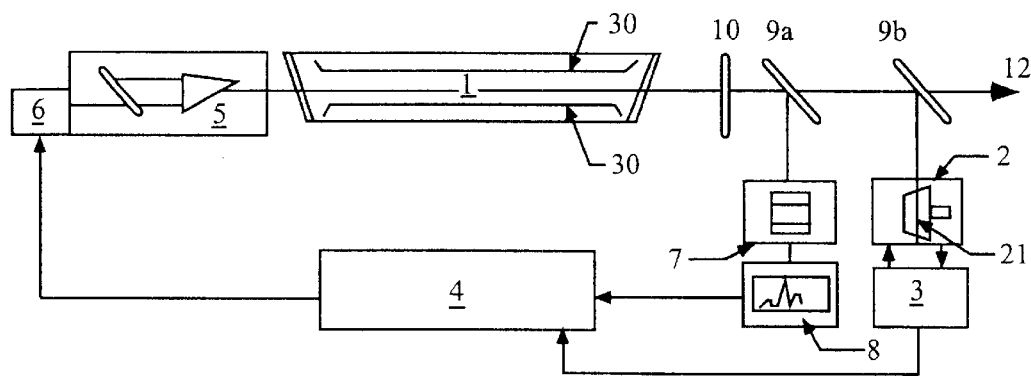
FIG. 1a schematically shows a narrow band excimer or molecular fluorine laser system according to a first embodiment.

A narrow band excimer or molecular fluorine laser system according to a first embodiment is shown at FIG. 1a and described below. The system will be described as being an ArF excimer laser, but the descriptions apply also to other excimer lasers such as KrF lasers and to the molecular fluorine ($F_2$) laser. The discussion of the preferred embodiment with respect to the ArF-excimer laser applies similarly throughout particularly to the molecular fluorine ($F_2$) laser, and when necessary, important differences will be described.

The main difference for the purposes of the preferred embodiments is that the $F_2$-laser emits around 157 nm, and not around 193 nm ( and the KrF laser emits around 248 nm). Thus, the wavelength calibration system for the $F_2$-laser will be sensitive to radiation around 157 nm, whereas that for the ArF-excimer laser system will be sensitive around 193 nm. Also, except where discussed with respect to wavelength calibration according to the present invention, species such as water vapor and oxygen that strongly photoabsorb around 157 nm will be substantially removed from the optical path of any 157 nm radiation, whereas such substantial removal may or may not be performed in the case of 193 nm radiation. In addition, various species will interact differently with incident 193 nm and 157 nm radiation. Further, some of the optics may differ due to their performance with respect to the particular wavelength radiation with which they are being used.

An ArF-excimer laser chamber 1 emitting around 193 nm is surrounded by various optical and electrical components. The chamber 1 itself is filled with a laser gas mixture and has a pair of main electrodes 30 and one or more preionization electrodes (not shown) therein for exciting the gas mixture. A gas handling unit (also not shown) is coupled with the laser chamber 1 so that a preferred gas composition may be maintained in the chamber 1. The laser chamber 1 normally has tilted windows, e.g., at Brewster's angle or at 5°. The laser system shown includes a resonator comprising a highly reflective mirror 10, a polarizer 13, a beam splitter 9a and a wavelength narrowing and tuning block 5. Many alternative ways are understood in the art for narrowing and tuning the laser beam.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382 and 5,946,337, and U.S. patent application Ser. Nos. 09/317,695, 09/130,277, 09/244,554, 09/317,527, 60/452,353, 09/602,184, 09/629,256 and 09/599,130, 60/170,342, 09/741,465, 60/178,620, 60/173,993, 60/166,277, 60/166,967, 60/167,835, 60/170,919, 60/186,096, 09/715,803, 60/215,933, 60/212,301, 60/212,257, 09/584,420, which are assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

The system further includes a wavelength calibration system including a wavelength calibration module 2. The wavelength calibration module 2 contains or comprises at least one element 21 which has an energy level transition line or lines around 193 nm for the ArF laser system, and in a preferred embodiment, two or more elements 21 are used either in the same module 2 or in an addition module. One or more energy level transition lines are detected which are atomic or molecular transitions between atomic, electronic or molecular energy states of the element 21. For the $F_2$ laser system, the element has a transition line around 157 nm. An optical transition is one caused, facilitated, or stimulated by interaction of the atom or molecule with a photon of light. Examples of interactions involving optical transitions include absorption, emission, Raman scattering, and stimulated emission, as well as the opto-galvanic effect.

The element 21 is preferably a gaseous vapor contained within a hollow cathode lamp 2. Vaporous species that may be used as the element 21 within the module 2 have lines around 193 nm. Some of those species include arsenic (193.759 nm), germanium (193.4048 nm), carbon (193.0905 nm, and other lines), iron, platinum, cobalt, gaseous hydrocarbons, halogenized hydrocarbons and carbon-contaminated inert gases (see Table I below). As discussed below, preferably both Fe and Ge, or another combination of elements, are used. For the $F_2$ laser, bromine, selenium and silicon may be used. In addition, oxygen may be used as the element 21 and has several optical transition lines within the broadband emission spectrum of the ArF-laser. Other species, in addition to those mentioned above, that have detectable level-transition lines within the broadband emission spectrum of the ArF laser (or correspondingly within the emission spectrum of the $F_2$ laser), may be used as the element 21 contained within the wavelength calibration module 2. Quasi-transparent crystals and liquids that exhibit transition lines around 193 nm may also be used.

Figure 1B:
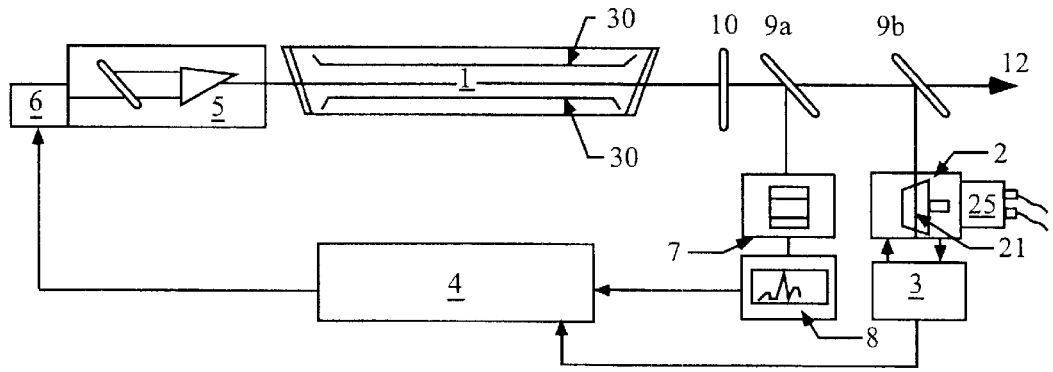
FIG. 1b schematically shows a narrow band excimer or molecular fluorine laser system according to a second embodiment.
Figure 4:
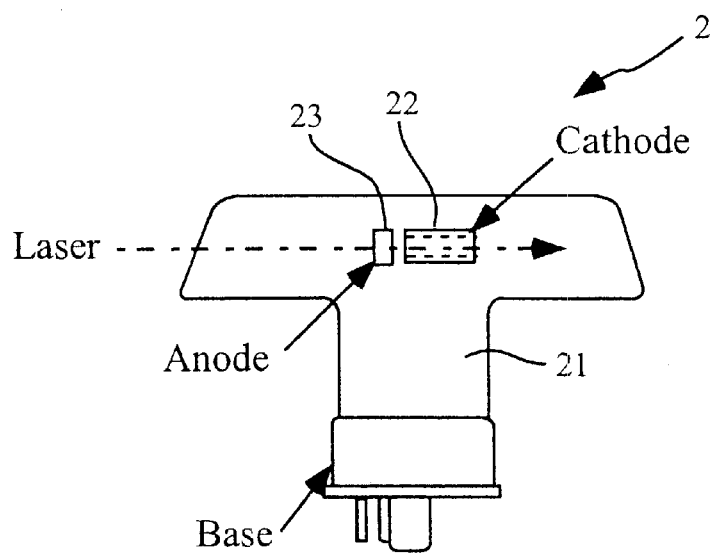
FIG. 4 schematically shows a first embodiment of a wavelength calibration module of the systems of FIGS. 1a and 1b.
Figure 5A:
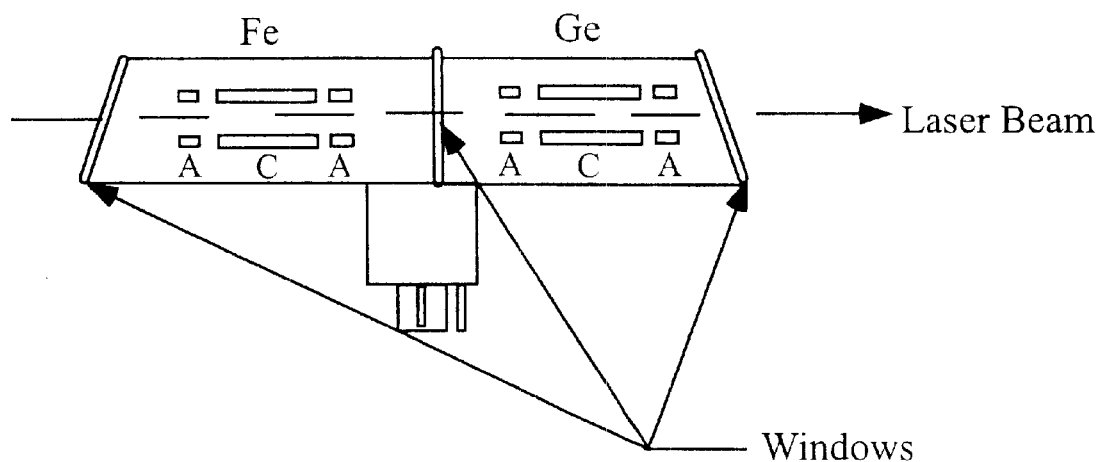
FIG. 5a schematically shows a second embodiment of a wavelength calibration module of the systems of FIGS. 1a and 1b.
Figure 5B:
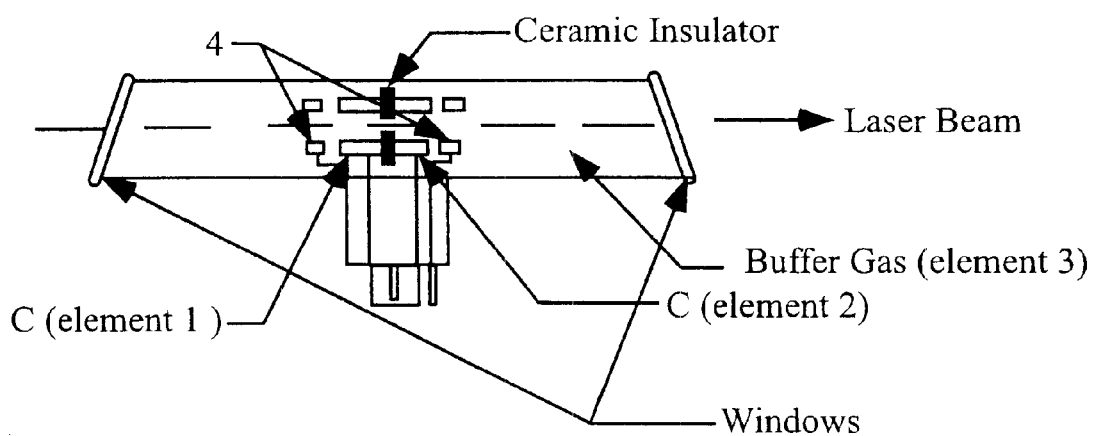
FIG. 5b schematically shows a third embodiment of a wavelength calibration module of the systems of FIGS. 1a and 1b.

For the purpose of distinguishing the embodiments of FIGS. 1a and 1b, reference is here briefly made to FIGS. 4 and 5a and 5b which show galvatrons which are example of wavelength calibration modules 2 that may be used with the laser system of FIG. 1a. Each galvatron is filled, and may be purged, with at least one element 21 in gaseous form (the galvatrons of FIGS. 5a and 5b clearly each indicate that two elements 21 are used). The cathode 22 may be formed of the material 21 in solid forms wherein vapor is given off from the cathode 22. The cathode 22 inside the galvatron may comprise the element 21 in solid form, and then release the element in gaseous form when a current is generated between the cathode 22 and its associated anode 23 inside the galvatron. The cathode 22 may be formed as just described and a second element 21 that photoabsorbs around 193 nm (or 157 nm) may fill the volume of the galvatron such that two elements have optical transitions around the wavelength of interest, or there may be two cathodes as shown at FIGS. 5a and 5b (and described in more detail below).

A laser beam portion may enter and/or exit the module through Brewster windows. Laser light from the laser chamber 1 passes through the cathode 22 causing an inter-level resonance of the gaseous species when the wavelength of the laser light corresponds to an inter-level transition energy of the element 21. A marked voltage change is detected between the cathode 22 and the anode 23 when the laser light is tuned to these particular wavelength(s). Therefore, when the beam has a wavelength which corresponds to an energy level transition of the gaseous species 21 within the galvatron, a voltage change is detected and the absolute wavelength of the narrowed band is then determinable. A extremum of the voltage measured when the current is passed between the cathode and anode represents a peak in the spectral distribution of the laser beam being measured. As described in more detail below, preferably at least two such extrema are used corresponding to optical transitions of at least two elements whose vapors fill at least a portion of the space along the optical path of the beam within the galvatron.

The galvatron may be used in a different way as shown in FIG. 1b. FIG. 1b includes the setup of FIG. 1a and additionally includes a photodetector arranged near the galvatron. In the system of FIG. 1b, the galvatron serves as a module 2 filled with the element 21 in gaseous form, as described above. In fact, a galvatron itself need not be used in the embodiment of FIG. 1b, any cell filled with the gaseous element 21 may be used. The arrangement wherein one or more cathodes 22 are formed of the material 21 and gives off the vapor when a current is passed, as the galvatron would do, is preferred. The gaseous element 21 may be caused to fill the galvatron, or merely the space within the hollow cathode where the laser beam passes through, by forming the cathode 22 of the galvatron out of the element 21 in solid form, and running a current between the anode 23 and the cathode 22 of sufficient amplitude to sublimate the element 21.

The voltage across the anode and cathode are not monitored in the system of FIG. 1b, as they are with the system of FIG. 1a (i.e., for the purpose of detecting energy level or opto-galvanic resonances in species of the element 21 induced by the incident light). Instead, the intensity of the light as it passes through the galvatron is detected. By so doing, absorption lines of the one or more elements 21 are detected when the detected intensity is reduced below that which is expected at the wavelengths corresponding to the absorption lines. Since the absolute wavelengths of photo-absorption are known for the element 21, the absolute wavelength of the laser light is determinable. While it is preferred to detect two or more optical transition lines herein, one line may be detected by the opto-galvanic effect as in the system of FIG. 1a, and the other line may be detected by using the detector 25 and measuring absorption as in the system of FIG. 1b, such as in a hybrid system.

For the $F_2$-laser emitting around 157 nm, different photoabsorbing species may be used. These species include selenium (157.530 nm), bromine (157.484 nm and 157.639 nm) and silicon. At the same time, arsenic, germanium, carbon and platinum are not used for wavelength calibration of the $F_2$-laser. The preferred species is bromine because the relative intensity of absorption of each of the 157.484 nm and 157.639 nm lines is very strong. For example, the relative intensity of absorption of each of these lines is as much as 100 to 200 times stronger than the selenium line.

Another advantage of bromine is its two lines, instead of one, allowing more versatility in the way absolute wavelength detection is performed for the $F_2$ laser, as is better understood after reading the descriptions below. The 157.484 nm absorption line of bromine is near the 157.523 nm emission line of the $F_2$ laser, while the 157.639 nm absorption line of bromine is near the 157.629 nm emission line of the $F_2$ laser. Even if one of the $F_2$ emission lines is selected to obtain a very narrow linewidth output beam (see, e.g., U.S. patent applications Ser. Nos. 09/317,695, 60/212,183, 60/249,357, 60/212,257, 60/212,301, 60/173,993, 60/166,967 and 09/317,527, which are assigned to the same assignee as the present application, and which are hereby incorporated by reference), use of bromine allows absolute wavelength calibration to be performed when either of the two closely spaced $F_2$ laser emission lines is selected.

The wavelength of the laser light is determined from a knowledge of the energy band levels and transition probabilities of species of the gaseous element 21. That is, when the wavelength of the laser beam is tuned through the broadband spectrum of the ArF laser, the absolute wavelength of the beam is precisely determined each time it corresponds to an inter-level transition energy of the gaseous species 21 having a finite transition probability density. The absolute wavelengths of the transition level resonance modes are precisely and reliably known since they are determined by relative positions of adjacent or removed quantized energy states of the photo-absorbing element, and applicable transition-selection rules. The broadband ArF-excimer laser emission spectrum ranges between 192.5 and 194.0 nm, and is most intense between 193.0 and 193.6 nm.

An ArF-excimer laser system including a wavelength calibration module as in FIGS. 1a and 1b preferably includes the following electrical and optical components. A main control unit 4 communicates electronically with a motor drive 6 for a line-narrowing and tuning block 5 (see references describing alternative line-narrowing configurations, mentioned above), as well as with a display 8. The main control unit 4 is either a standard PC or an especially designed microprocessor unit for controlling the laser system.

The system further includes a signal processing and driving source 3 for the wavelength calibration module 2.

Alternatively, the processor 4 may directly control the module 2. The signal processing and driving source 3 provides an electrical supply for the wavelength calibration module 2. The signal processing and driving source further detects changes in current through the galvatron when irradiated with narrow bandwidth radiation matching a transition line of the one or more gaseous elements 21. These current changes can be quite small, and thus, precision circuitry is often used.

The display 8 receives its signal information from a wavelength monitoring component 7. The wavelength monitoring component 7 preferably includes a wavelength dispersion element or interference device and a photodetector. A typical layout includes a monitor Fabry-Perot etalon, some lenses and a photo diode array, wherein the etalon fringe pattern is imaged onto the diode array. When the wavelength of the laser is tuned by the motor drive 6, then the fringe pattern moves on the diode array and the wavelength shift can be measured when the free spectral range of the etalon is known.

On one end of the laser chamber 1, a light beam from the chamber 1 impinges a first beam splitter 9a which separates the beam into a component directed toward the line narrowing and tuning block 5, and a component which is unreflected and includes the output beam 12. In this sense the beam splitter 9a serves to outcouple the beam 12. One skilled in the art understands that many resonator configurations are possible (see patents and patent applications cited herein). The line narrowing and tuning block is the line narrowing part of the resonator. The beam splitter 9a may be a polarizing beam splitter. The line narrowing and tuning block 5 can comprise one or more prisms and a high reflectivity mirror, when line narrowing to only about 10 to 100 pm is desired. The line narrowing and tuning block 5 can comprise one or more prisms and a grating when line narrowing to less than 1 pm is desired. For further line narrowing, the line narrowing and tuning block can comprise one or more interferometric devices, which may be an etalon having parallel plates, such as may be described at U.S. patent application Ser. No. 09/715,803, which is assigned to the same assignee as the present application and is hereby incorporated by reference.

The beam splitter 9a reflects some of the beam and most of the rest of the beam continues unreflected along the optical path. The unreflected portion impinges a second beam splitter 9b which separates the unreflected beam into a component directed toward the wavelength monitoring component 7, and a component which serves as the narrow band output beam 12.

At the other end of the chamber 1, a beam emerges from the chamber 1 and impinges a polarizer 13 and later impinges a resonator mirror 10. The preferred resonator of FIG. 1a is thus a polarization coupled resonator design. The polarizer 13 adjusts the polarization state of the laser radiation, which is particularly significant upon being directed onto the beam splitter 9a (see also U.S. Pat. No. 5,559,816, which is hereby incorporated by reference). The chamber 1 may also have one or more windows tilted at Brewster's angle with respect to the resonating beam. Alternatively, a partially reflecting output coupler may be used, wherein line-narrowing optics 5 would preferably be on the other side of the chamber 1, and the outcoupling of the beam portion for wavelength calibration to the module 2 may be otherwise performed.

In the arrangement shown in FIGS. 1a–1b, the resonator mirror 10 reflects most of the beam, but allows a small portion to continue unreflected, either by transmittance through the mirror 10 or by simply not impinging the mirror 10. Typically in the transmission case, the mirror 10 has a transmittance in the range from 0.1 to 1%. Specifically, the transmittance is preferably around 0.5%. The unreflected portion continues until it impinges upon the wavelength calibration tool 2.

Using this preferred arrangement, very precise absolute wavelength calibration can be performed. The calibration can be performed during operation of the system in its usual capacity, or during a short interim period between scheduled or unscheduled run times, without additional optical alignment, and may be performed at the factory.

Referring specifically to the system of FIG. 1a, an exemplary calibration procedure using the system of FIG. 1a is as follows. First, a coarse tuning of a narrow band emission of the ArF-laser 1 by the main control unit 4 is done via the spectral narrowing module 5, and the motor drive 6. The spectral narrowing module 5 is preferably a grating and is used for tuning of the wavelength of the system. The wavelength position is observed by a wavelength monitoring module 7 preferably including a Fabry-Perot etalon. The fringe pattern is displayed on the display 8. Simultaneously, a signal of the potential difference between the cathode 22 and the anode 23 of the galvatron 2 is monitored by the signal processing unit 3. The main processing and data recording element 4 communicates with the signal processing and driving source 3. When a coincidence of the wavelength of the narrowed spectral beam with one of the optical transition lines of the element 21 occurs, as discovered by a marked voltage increase (or detected drop in intensity), a fine tuning across the known waveform of the line proceeds for determining more precisely the absolute position of the narrowed band. The position of the transition line corresponding to the spectral arrangement of the system, is recorded by the main control unit 4 for future reference. The wavelength may be moved away from the absorption line to a desired wavelength near the absorption line using the wavelength monitoring module 7 including the monitor etalon by counting fringes and knowing the free spectral range of the etalon, and the information about the position of the absorption line relative to the fringe pattern produced by the etalon.

An exemplary procedure for calibrating the free spectral range of the monitor etalon or other wavelength detection and control unit such as a monitor grating will now be described. The galvatron 2 may be as shown and described herein in any of the embodiments wherein at least two species are contained in the galvatron (or other housing of the species according to the embodiment of FIG. 1b) having optical transitions in the tuning range of the laser. The wavelength of the laser beam is scanned through a transition line of each of at least two species. The monitor etalon or other wavelength detection and control unit is monitored when the wavelength is scanned. By counting the number fringes of the monitor etalon corresponding to the wavelength range between the optical transition lines of the two species, the free spectral range of the etalon is calibrated.

A further procedure may be performed after the etalon free spectral range is calibrated. The spectral narrowing and tuning unit is now scanned in tuning steps (e.g., of a rotatable grating, or rotatable mirror such as in a Littman configuration, or adjustments of pressure of an enclosure of an optics of the resonator such as is described in U.S. patent application No. 60/178,445, which is assigned to the same assignee as the present application and is hereby incorporated by reference, or other means for tuning the wavelength of the tunable laser known to those skilled in the art). The tuning steps of the spectral narrowing and tuning unit are calibrated to the monitor etalon (or other wavelength detection and control device) that has been calibrated to the absolute wavelengths of optical transitons of species within the galvatron. Alternatively, the tuning steps of the spectral narrowing and tuning unit are calibrated directly to the optical transitions of the species of the galvatron.

A modification in the design of the galvatron 2 can be performed which serves to enhance the optical transition line around 193.3 nm. The signal to noise ratio for the system may be enhanced by using special mixtures of buffer gases and evaporized elements and/or special cathode materials. An enhancement of usual absorption signals of the galvatron and/or a rise of weaker lines situated nearer the middle of the tuning range could be expected. A preferred buffer gas mixture for the galvatron includes krypton. Alternative gases include neon, xenon and helium. Further details of this embodiment will be given below.

As discussed briefly above, and alternatively to the arrangement of FIG. 1a, a photodetector 25 may be disposed near and after the galvatron and located such that the portion of laser light traversing the element 21, later impinges the photodetector. The preferred method is then modified using the embodiment of FIG. 1b, such that the voltage between the cathode 22 and the anode 23 are not monitored. A current is only generated between the cathode 22 and anode 23, if at all, to cause gaseous release of the solid element 21 comprising the cathode 22. The photodetector 25 monitors the intensity of the light emitted from the ArF-laser chamber after it has traversed the gaseous galvatron medium. At absorption lines of the gaseous species 21, the absolute wavelength of the light is determinable. Further to this alternative method, a hollow lamp may be filled with the gaseous element 21 in another way than release from a cathode 22, thus obviating the need for the cathode 22 and anode 23. The galvatron of the embodiment of FIG. 1a is then modified to be a chamber filled with the gaseous element 21 and arranged along the excimer-laser beam path between the discharge chamber 1 and the photodetector 25.

Figure 2:
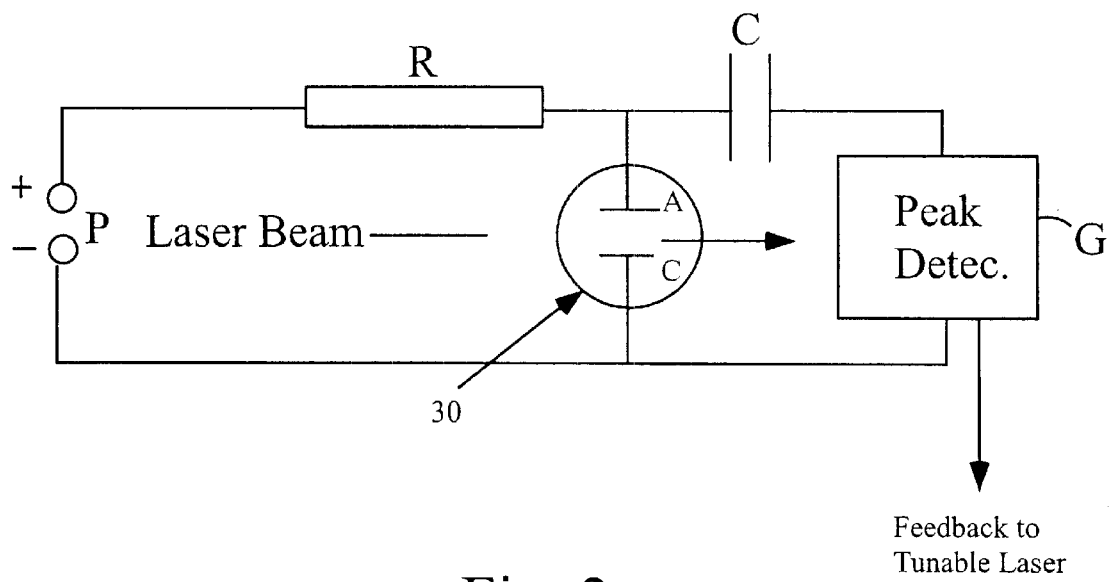
Figure 3:
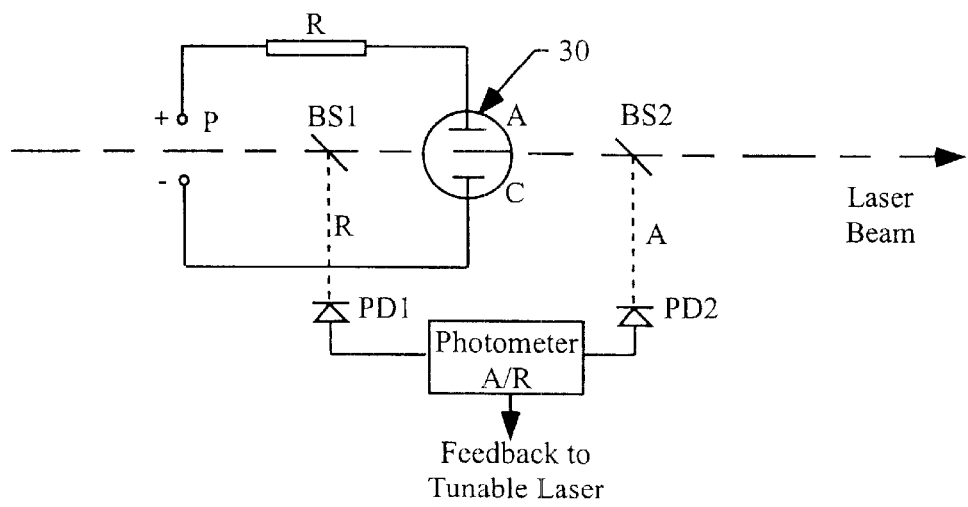
FIG. 3 schematically shows an equivalent circuit corresponding to the use of the wavelength calibration module of the system of FIG. 1b.

FIGS. 2 and 3 schematically show equivalent circuit designs corresponding to wavelength calibration according to the systems of FIGS. 1a and 1b, respectively. FIGS. 2 and 3 illustrate differences between the embodiments of FIGS. 1a and 1b.

Referring to FIG. 2, a current is passed between the anode A and the cathode C using a power supply P and a resistor in series with the anode-cathode arrangement. The voltage across the anode-cathode is measured using a galvanometer G shown connected into the circuit in series with a capacitor and the anode-cathode. The current or voltage may be measured in many ways known to those skilled in the art. The detector G sends a feedback signal to the processor 4 for performing the wavelength calibration.

Referring to FIG. 3, a photodetector PD1 is disposed to receive a beam portion reflected from a first beam splitter BS1 before the beam encounter the photoabsorbing element of the anode-cathode arrangement, or otherwise as described above. A second photodetector PD2 receives a beam portion reflected from a second beam splitter BS2 disposed after the photoabsorbing element in the laser beam path. A photometer measures a ratio of the detected beam and determines when extrema are recorded corresponding to absorption lines of the photoabsorbing element.

In accord with a preferred embodiment, more than one line of platinum, iron, germanium, carbon, oxygen, gaseous hydrocarbons, halogenized hydrocarbons, carbon-contaminated inert gases and/or arsenic are preferably used. However, other elements having absorption and/or emission lines around the wavelength of interest, e.g., 157 nm for the F2 laser, 193 nm for the ArF laser and 248 nm for the KrF laser, may be used. Preferably one or more of platinum, iron and germanium are used for ArF laser wavelength calibration.

In this embodiment, preferably two iron lines are used. Alternatively, two platinum lines, two germanium lines, a platinum line and a germanium line, an iron line and either a platinum line or a germanium line may be used. In fact, any two known lines may be used wherein their wavelengths are known and within the tuning range of the tunable (e.g., ArF) laser.

In a first embodiment, the free spectral range (FSR) of a monitor Fabry-Perot etalon 7 is precisely determined when the wavelength of the laser is tuned between two or more lines of the one or more gases named above. The lines or fringes in the spectral response of the etalon shift as the laser wavelength is tuned. The number of fringes, including fractions of fringes, that cross a point on a detector array located after the etalon 7 are counted. The FSR is determined based on a known dependence of the FSR on the wavelength, or in this case the wavelength shift, of the laser between the two optical transition lines of known wavelength. Preferably, a processor 4 controls the wavelength and counts the fringes and calculates the FSR automatically. Advantageously, an optical transition of each of two or more species may be used, wherein the two lines are advantageously positioned within the tuning range of the laser, such as one being very close to a desired operating wavelength.

In a second embodiment, once the FSR of the monitor etalon 7 is precisely determined, then the grating or mirror of a Littman configuration, each of which is rotatably adjustable for tuning the wavelength of the laser, is calibrated. Other means for tuning the wavelength may be calibrated as well, including a pressure tuned enclosure or rotation of another element such as a prism or two synchronously rotatable prisms (see U.S. patent application Ser. No. 09/244,554, which is assigned to the same assignee and is hereby incorporated by reference). That is, the precise wavelength of the laser is determined at each of multiple steps in the rotation range of the grating. The wavelength is determined using the monitor etalon 7, which has been precisely calibrated, for each of the step positions of the grating. Preferably, the wavelength corresponding to each step position is recorded by a processor. The same or a different processor controls the grating and receives signals from the grating or grating control motor and from the detector after the etalon 7 to quickly and automatically perform the grating calibration (or again, tuning steps of another tuning element).

In a third embodiment, the gas cell for performing the absolute wavelength calibration using the opto-galvanic effect or a photodetector for measuring absorption by the gas in the cell has two or more materials, such as two of those described above, that optically interact within the tuning range of the laser. For example, the gas cell may have iron and platinum or iron and germanium or platinum and germanium within it. Iron or platinum in combination with germanium are particularly considered to be useful combinations. This is because one of the wavelengths (193.368 nm) at which the ArF laser is expected to operate is about 35 pm from the germanium line at 193.4048 nm and about 85 pm from the iron line at 193.453 pm (and about 75 pm from the nearest platinum line). The germanium line at 193.4048 pm is advantageously within 50 pm from the operating line, and thus the relative wavelength calibration using the monitor etalon can be performed more accurately than when the nearest absorption is spectrally further away owing to the increased uncertainty involved with moving the wavelength an increased number of FSRs with the monitor etalon 7.

The two materials may be filled into a single gas cell in gaseous form. Alternatively, one of the gases may be filled into the gas cell in gaseous form and the other may form all or a portion of the cathode of an anode-cathode pair within the cell. When the cathode is heated up, the material forming the cathode vaporizes and partially fills the space between the anode and cathode along the laser beam path. The galvatron of FIG. 4 may be used in this embodiment.

Both of the materials may form the cathode, and both may evaporate as the cathode is heated to fill the space between the anode and cathode along the beam path. Such a cathode may have two halves each of one of the two materials, or the cathode may be an alloy including the two materials. Additionally, one gas cell may include two cathodes, as illustrated schematically at FIG. 5a, one of the cathodes being formed of one of the materials, e.g., Fe, and the other of the two cathodes being formed of the second of the two materials, e.g., Ge, that optically interact within the tuning range of the laser. As shown in the tandem hollow cathode lamp of FIG. 5a, the Fe cathode is housing in a first chamber of the lamp, while a germanium cathode is housed in a second chamber sealed off from the first chamber. In this way, opto-galvanic or photoabsorption detection can be performed using the two materials in the two respective chambers of the tandem lamp, simultaneously.

In an alternative embodiment, two gas cells may be used such as that shown at FIG. 4. One of the two gas cells would be filled with one of the gases mentioned above and the other gas cell would be filled with another of the gases. The two gas cells may be successively positioned along the beam path such that the beam first traverses the medium within the first gas cell and then traverses the medium within the second gas cell. The two lines would be detected, each using its own gas cell.

In a further alternative embodiment, a hollow cathode cell is shown including a single chamber. The cell has a dual cathode wherein a first material such as Fe and a second material Ge or Pt form a cathode and are shown separated by a ceramic insulator. Each of the two elements sublimates within the cell when a current is passed through. The single chamber of the cell of FIG. 5b then has vapor of both elements therein along the path of the laser beam. In this alternative way, absolute wavelength calibration using multiple elements each having an optical transition line at a wavelength of interest (157 nm, 193 nm, 248 nm, for example) is performed using the opto-galvanic effect or photoabsorption measurement according to the above.

Although the above have been described with particular application to the ArF laser, the above aspects and preferred and alternative embodiments may be applied within the spirit of the invention to the F2 laser or the KrF laser or another excimer laser for which accurate wavelength information is desired. For the KrF laser, two iron lines may be used. For the F2 laser, bromine, selenium, silicon and/or bismuth may be used. For example, the cathode may be formed at least partially of bismuth and the cell partially filled with bromine for $F_2$ laser absolute wavelength calibration. Further details and aspects of the invention are set forth below, and one or ordinary skill in the art would realize that further alternative embodiments may be realized within the scope of the preferred embodiments described herein.

With respect to the just described embodiments wherein two materials are preferably used, hollow cathode lamps with a single element cathode, e.g., Fe, are already used for calibration of KrF lithography lasers using the opto-galvanic effect (see FIGS. 1a and 2) or absorption/emission detection (see FIGS. 1b and 3). In practice, there are generally not multiple calibration lines advantageously spectrally located with a single element hollow cathode lamp in the operation range of the tunable lithography laser. Therefore, using a multiple element cathode arrangement (e.g., two or more elements) or a specially designed tandem hollow cathode lamp as shown in FIGS. 5a and 5b is advantageous for increasing the precision of the absolute wavelength calibration in the tuning range of the calibrated laser type.

At least the following advantages have been discussed:

a) Higher precision of absolute wavelength calibration in the scanning range of the selected tunable laser; and b) Possibility to increase the precision of laser wavelength scanning or monitoring parameters (e.g., a grating scanning constant or free spectral range of the monitor etalon used for wavelength/bandwidth stabilization may be precisely calibrated).

Conventionally, a single element see through hollow cathode lamp is used for calibration using opto-galvanic effect or absorption detection. A further improvement is achieved in the following way. Selection of an advantageous buffer gas can produce more intensive lines in the buffer gas of the see-through hollow cathode lamp, which can be used as marking lines for better automatic identification of the cathode calibration lines. According to a preferred embodiment, krypton is used as a buffer gas for more stable opto-galvanic effect calibration. Additionally, using different buffer gases in the single hollow cathode lamp chambers of the tandem hollow cathode lamp of either of FIGS. 5a and 5b can expand the number of possible calibration response marking lines that may be used.

Table I, below, shows several elements that may be used as materials that have optical transitions around wavelength of interest for the ArF laser (i.e., around 193.3 nm) and for the $F_2$ laser (i.e., around 157 nm). Any two of these materials may be used advantageously with any of the embodiments just mentioned:

| Element | Calibration Wavelength/nm | Used for Laser: |
| --- | --- | --- |
| C | 193.09056 | ArF |
| Pt | 193.22433 | ArF |
| Ge | 193.40480 | ArF |
| Pt | 193.43690 | ArF |
| Fe | 193.4538 | ArF |
| Co | 193.658 | ArF |
| Fe | 193.72690 | ArF |
| Pt | 193.74245 | ArF |
| Ge | 193.74830 | ArF |
| As | 193.7590 | ArF |
| Br | 157.484 | F2 |
| Se | 157.530 | F2 |
| Br | 157.639 | F2 |

The embodiments described herein may be used in conjunction with calibration of any of: Lithography lasers @248(KrF), 193(ArF), 157 ($F_2$) nm; Oscillator/Amplifier Excimer laser systems @193 (ArF), 248 (KrF), 308 (XeCl), 157($F_2$) and 351 (XeF); harmonics modules or oscillator and amplifier solid state lasers (e.g. Alexandrite, Ti-Saphire, Nd:YAG, Nd:YLF, etc.); tunable OPO/OPA systems and dye lasers, among other tunable laser systems known to those skilled in the art. The elements chosen would have optical transitions in the tuning ranges of these tunable laser systems.

Further embodiments may be realized in the scope and spirit of the embodiment already described. For example, a multiple-element hollow cathode lamp for calibration of tunable laser systems may have a cathode that is made from an alloy which consists two or more elements (e.g., selected from the elements set forth at Table 1). Such an alloyed cathode may be used for precise calibration of tunable laser systems (e.g. lithography lasers such as ArF or $F_2$ lasers) using the opto-galvanic effect or absorption/emission in metal vapor coming from the cathode alloy.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. In particular, the invention is to be interpreted in accordance with the appended claims, and equivalents thereof, without limitations being read from the specification above.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

What is claimed is:

1. A tunable laser system. comprising:

a gain medium and an optical resonator for generating a laser beam a spectral narrowing and tuning unit within the resonator;

a detection and control unit for relative wavelength detection and control; and a wavelength calibration module for calibrating the detection and control unit, said module containing a plurality of species each having an optical transition line within the tuning range of said laser, wherein a beam portion of the narrowed emission from said laser is directed through the wavelength calibration module and a beam portion is directed through the detection and control unit when the laser beam is scanned through said optical transition line of each of said plurality of species and said detection and control unit is monitored for calibrating said detection and control unit, wherein said laser system is an ArF laser system emitting around 193 nm and said plurality of species are selected from the group consisting of arsenic, carbon, germanium. cobalt, iron, hydrocarbons. halogenized hydrocarbons, carbon-contaminated inert gases, oxygen and platinum vapor, wherein said wavelength calibration module further contains a buffer gas, wherein said buffer gas contained within said wavelength calibration module includes krypton.

2. A tunable laser system, comprising:

a gain medium and an optical resonator for generating a laser beam a spectral narrowing and tuning unit within the resonator;

a detection and control unit for relative wavelength detection and control; and a wavelength calibration module for calibrating the detection and control unit, said module containing a plurality of species each having an optical transition line within the turning range of said laser, wherein a beam portion of the narrowed emission from said laser is directed through the wavelength calibration module and a beam portion is directed through the detection and control unit when the laser beam is scanned through said optical transition line of each of said plurality of species and said detection and control unit is monitored for calibrating said detection and control unit, wherein said wavelength calibration module includes a first cathode made of a first material of said plurality of species and a second cathode made of a second material of said at plurality of species different than said first material, wherein said wavelength calibration module further contains a buffer gas, wherein said buffer gas contained within said wavelength calibration module includes krypton.

3. A tunable laser system. comprising:

a gain medium and an optical resonator for generating a laser beam a spectral narrowing and tuning unit within the resonator;

a detection and control unit for relative wavelength detection and control; and a wavelength calibration module for calibrating the detection and control unit, said module containing a plurality of species each having an optical transition line within the tuning range of said laser, wherein a beam portion of the narrowed emission from said laser is directed through the wavelength calibration module and a beam portion is directed through the detection and control unit when the laser beam is scanned through said optical transition line of each of said plurality of species and said detection and control unit is monitored for calibrating said detection and control unit, wherein said wavelength calibration module includes a cathode made of a first material of said plurality of species and a gaseous species of said plurality of species different from the species of said first material, wherein said wavelength calibration module further contains a buffer gas including krypton.

4. A tunable laser system, comprising:

a gain medium and an optical resonator for generating a laser beam a spectral narrowing and tuning unit within the resonator;

a detection and control unit for relative wavelength detection and control; and a wavelength calibration module for calibrating the detection and control unit, said module containing a plurality of species each having an optical transition line within the tuning range of said laser, wherein a beam portion of the narrowed emission from said laser is directed through the wavelength calibration module and a beam portion is directed through the detection and control unit when the laser beam is scanned through said optical transition line of each of said plurality of species and said detection and control unit is monitored for calibrating said detection and control unit, wherein said wavelength calibration module includes a first gaseous species of said plurality of species and a second gaseous species of said plurality of species different from the first gaseous species.

wherein said wavelength calibration module further contains a buffer gas including krypton.

5. A tunable laser system, comprising:

a gain medium and an optical resonator for generating a laser beam a spectral narrowing and tuning unit within the resonator;

a detection and control unit for relative wavelength detection and control; and a wavelength calibration module for calibrating the detection and control unit, said module containing at least one species having an optical transition line within the tuning range of said laser and a buffer gas, wherein a beam portion of the narrowed emission from said laser is directed through the wavelength calibration module and a beam portion is directed through the detection and control unit when the laser beam is scanned through said optical transition line of the at least one species and said detection and control unit is monitored for calibrating said detection and control unit, wherein said buffer gas includes krypton.

6. A tunable laser system comprising:

a gain medium and an optical resonator for generating a laser beam a spectral narrowing and tuning unit within the resonator;

a detection and control unit for relative wavelength detection and control; and a wavelength calibration module for calibrating the detection and control unit, said module containing at least one species having an optical transition line within the tuning range of said laser and a buffer gas, wherein a beam portion of the narrowed emission from said laser is directed through the wavelength calibration module and a beam portion is directed through the detection and control unit when the laser beam is scanned through said optical transition line of the at least one species and said detection and control unit is monitored for calibrating said detection and control unit, wherein said buffer gas includes neon.

7. A tunable laser system, comprising:

a gain medium and an optical resonator for generating a laser beam a spectral narrowing and tuning unit within the resonator;

a detection and control unit for relative wavelength detection and control; and a wavelength calibration module for calibrating the detection and control unit, said module containing at least one species having an optical transition line within the tuning range of said laser and a buffer gas, wherein a beam portion of the narrowed emission from said laser is directed through the wavelength calibration module and a beam portion is directed through the detection and control unit when the laser beam is scanned through said optical transition line of the at least one species and said detection and control unit is monitored for calibrating said detection and control unit, wherein said buffer gas includes helium.

8. A tunable laser system, comprising:

a gain medium and an optical resonator for generating a laser beam a spectral narrowing and tuning unit within the resonator;

a detection and control unit for relative wavelength detection and control; and a wavelength calibration module for calibrating the detection and control unit, said module containing at least one species having an optical transition line within the turning range of said laser and a buffer gas, wherein a beam portion of the narrowed emission from said laser is directed through the wavelength calibration module and a beam portion is directed through the detection and control unit when the laser beam is scanned through said optical transition line of the at least one species and said detection and control unit is monitored for calibrating said detection and control unit.

wherein said buffer gas includes xenon.

9. A method for calibrating a wavelength detection and control unit of a tunable laser system having a wavelength calibration module containing at least one species having an optical transition line within the tuning range of said laser, a spectral narrowing and tuning unit, and a wavelength detection and control unit, comprising the steps of:

pressurizing said wavelength calibration module with a buffer gas sufficient to produce marking lines within a tuning spectrum of said laser system;

generating a line-narrowed laser beam;

directing a narrowed beam portion through the wavelength calibration module;

directing a narrowed beam portion through the detection and control unit; scanning the laser beam through said optical transition line of the at least one species; and monitoring the detection and control unit during said scanning for calibrating said detection and control unit, wherein said buffer gas includes krypton.

10. A method for calibrating a wavelength detection and control unit of a tunable laser system having a wavelength calibration module containing at least one species having an optical transition line within the tuning range of said laser, a spectral narrowing and tuning unit, and a wavelength detection and control unit, comprising the steps of:

pressurizing said wavelength calibration module with a buffer gas sufficient to produce marking lines within a tuning spectrum of said laser system;

generating a line-narrowed laser beam;

directing a narrowed beam portion through the wavelength calibration module;

directing a narrowed beam portion through the detection and control unit; scanning the laser beam through said optical transition line of the at least one species; and monitoring the detection and control unit during said scanning for calibrating said detection and control unit, wherein said buffer gas includes neon.

11. A method for calibrating a wavelength detection and control unit of a tunable laser system having a wavelength calibration module containing at least one species having an optical transition line within the tuning range of said laser, a spectral narrowing and tuning unit, and a wavelength detection and control Unit, comprising the steps of:

pressurizing said wavelength calibration module with a buffer gas sufficient to produce marking lines within a tuning spectrum of said laser system;

generating a line-narrowed laser beam;

directing a narrowed beam portion through the wavelength calibration module;

directing a narrowed beam portion through the detection and control unit;

scanning the laser beam through said optical transition line of the at least one species; and monitoring the detection and control unit during said scanning for calibrating said detection and control unit, wherein said buffer gas includes helium.

12. A method for calibrating a wavelength detection and control unit of a tunable laser system having a wavelength calibration module containing at least one species having an optical transition line within the tuning range of said laser, a spectral narrowing and tuning unit, and a wavelength detection and control unit, comprising the steps of:

pressurizing said wavelength calibration module with a buffer gas sufficient to produce marking lines within a tuning spectrum of said laser system;

generating a line-narrowed laser beam;

directing a narrowed beam portion through the wavelength calibration module;

directing a narrowed beam portion through the detection and control unit; scanning the laser beam through said optical transition line of the at least one species; and monitoring the detection and control unit during said scanning for calibrating said detection and control unit, wherein said buffer gas includes xenon.

13. A tunable laser system, comprising:

a gain medium and an optical resonator for generating a laser beam;

a spectral narrowing and tuning unit; and a wavelength calibration module containing a plurality of species each having an optical transition line within the tuning range of said laser, wherein a beam portion of the narrowed emission from said laser is directed through the wavelength calibration module when the laser beam is scanned through said optical transition line of each of said plurality of species and said spectral narrowing and tuning unit is monitored for calibrating tuning steps of said spectral narrowing and tuning unit, wherein said laser system is an ArF laser system emitting around 193 nm and said plurality of species are selected from the group consisting of arsenic, carbon, germanium, cobalt, iron, hydrocarbons, halogenized hydrocarbons, carbon-contaminated inert gases, oxygen and platinum vapor.

wherein said wavelength calibration module further contains a buffer gas, wherein said buffer gas contained within said wavelength calibration module includes krypton.

14. A tunable laser system, comprising:

a gain medium and an optical resonator for generating a laser beam;

a spectral narrowing and tuning unit; and a wavelength calibration module containing a plurality of species each having an optical transition line within the tuning range of said laser.

wherein a beam portion of the narrowed emission from said laser is directed through the wavelength calibration module when the laser beam is scanned through said optical transition line of each of said plurality of species and said spectral narrowing and tuning unit is monitored for calibrating tuning steps of said spectral narrowing and tuning unit, wherein said wavelength calibration module includes a first cathode made of a first material of said plurality of species and a second cathode made of a second material of said at plurality of species different than said first material, wherein said wavelength calibration module further contains a buffer gas.

wherein said buffer gas contained within said wavelength calibration module includes krypton.

15. A tunable laser system, comprising:

a gain medium and an optical resonator for generating a laser beam;

a spectral narrowing and tuning unit; and a wavelength calibration module containing a plurality of species each having an optical transition line within the tuning range of said laser, wherein a beam portion of the narrowed emission from said laser is directed through the wavelength calibration module when the laser beam is scanned through said optical transition line of each of said plurality of species and said spectral narrowing and tuning unit is monitored for calibrating tuning steps of said spectral narrowing and tuning unit, wherein said wavelength calibration module includes a cathode made of a first material of said plurality of species and a gaseous species of said plurality of species different from the species of said first material, wherein said wavelength calibration module further contains a buffer gas including krypton.

16. A tunable laser system, comprising:

a gain medium and an optical resonator for generating a laser beam;

a spectral narrowing and tuning unit; and a wavelength calibration module containing a plurality of species each having an optical transition line within the tuning range of said laser, wherein a beam portion of the narrowed emission from said laser is directed through the wavelength calibration module when the laser beam is scanned through said optical transition line of each of said plurality of species and said spectral narrowing and tuning unit is monitored for calibrating tuning steps of said spectral narrowing and tuning unit, wherein said wavelength calibration module includes a first gaseous species of said plurality of species and a second gaseous species of said plurality of species different from the first gaseous species, wherein said wavelength calibration module further contains a buffer gas including krypton.

17. A method for calibrating a wavelength detection and control unit of a tunable laser system having a wavelength calibration module containing at least one species having an optical transition line within the tuning range of said laser, and a spectral narrowing and tuning unit, comprising the steps of:

pressurizing said wavelength calibration module with a buffer gas sufficient to produce marking lines within a tuning spectrum of said laser system;

generating a line-narrowed laser beam;

directing a narrowed beam portion through the wavelength calibration module;

scanning the laser beam through said optical transition line of the at least one species; and monitoring the spectral narrowing and tuning unit dining said scanning for calibrating tuning steps of said spectral narrowing and tuning unit, wherein the buffer gas includes krypton.

18. A method for calibrating a wavelength detection and control unit of a tunable laser system having a wavelength calibration module containing at least one species having an optical transition line within the tuning range of said laser, and a spectral narrowing and tuning unit, comprising the steps of:

pressurizing said wavelength calibration module with a buffer gas sufficient to produce marking lines within a tuning spectrum of said laser system;

generating a line-narrowed laser beam;

directing a narrowed beam portion through the wavelength calibration module;

scanning the laser beam through said optical transition line of the at least one species; and monitoring the spectral narrowing and tuning unit during said scanning for calibrating tuning steps of said spectral narrowing and tuning unit, wherein the buffer gas includes neon.

19. A method for calibrating a wavelength detection and control unit of a tunable laser system having a wavelength calibration module containing at least one species having an optical transition line within the tuning range of said laser, and a spectral narrowing and tuning unit, comprising the steps of:

pressurizing said wavelength calibration module with a buffer gas sufficient to produce marking lines within a tuning spectrum of said laser system;

generating a line-narrowed laser beam;

directing a narrowed beam portion through the wavelength calibration module, scanning the laser beam through said optical transition line of the at least one species; and monitoring the spectral narrowing and tuning unit during said scanning for calibrating tuning steps of said spectral narrowing and tuning unit, wherein the buffer gas includes helium.

20. A method for calibrating a wavelength detection and control unit of a tunable laser system having a wavelength calibration module containing at least one species having an optical transition line within the tuning range of said laser, and a spectral narrowing and tuning unit, comprising the steps of:

pressurizing said wavelength calibration module with a buffer gas sufficient to produce marking lines within a tuning spectrum of said laser system;

generating a line-narrowed laser beam;

directing a narrowed beam portion through the wavelength calibration module;

scanning the laser beam through said optical transition line of the at least one species; and monitoring the spectral narrowing and tuning unit during said scanning for calibrating tuning steps of said spectral narrowing and tuning unit.

wherein the buffer gas includes xenon.

* * * * *